US007409825B2

(12) United States Patent
Stephenson

(10) Patent No.: US 7,409,825 B2
(45) Date of Patent: Aug. 12, 2008

(54) HYDRAULIC SYSTEM WITH A CYLINDER ISOLATION VALVE

(75) Inventor: Dwight B. Stephenson, Oconomowoc, WI (US)

(73) Assignee: HUSCO International, Inc., Waukesha, WI (US)

( * ) Notice: Subject to any disclaimer, the term of this patent is extended or adjusted under 35 U.S.C. 154(b) by 171 days.

(21) Appl. No.: 11/461,816

(22) Filed: Aug. 2, 2006

(65) Prior Publication Data

US 2008/0028924 A1 Feb. 7, 2008

(51) Int. Cl.
*F15B 11/00* (2006.01)
*F16D 31/00* (2006.01)

(52) U.S. Cl. .......................................... 60/403; 91/445

(58) Field of Classification Search .................. 60/403; 91/445, 447
See application file for complete search history.

(56) References Cited

U.S. PATENT DOCUMENTS

| | | | | |
|---|---|---|---|---|
| 4,165,675 | A * | 8/1979 | Cryder et al. | 91/445 |
| 4,278,011 | A * | 7/1981 | Parquet | 91/445 |
| 4,522,109 | A * | 6/1985 | Marchi et al. | 91/447 |
| 5,960,695 | A * | 10/1999 | Aardema et al. | 91/433 |
| 6,655,136 | B2 * | 12/2003 | Holt et al. | 60/414 |
| 6,691,510 | B2 * | 2/2004 | Kariya et al. | 60/403 |
| 6,715,402 | B2 * | 4/2004 | Pfaff et al. | 91/526 |
| 6,745,992 | B2 | 6/2004 | Yang et al. | |
| 7,093,383 | B2 | 8/2006 | Mennen | |
| 2005/0216105 | A1 | 9/2005 | Tabor | |

FOREIGN PATENT DOCUMENTS

| | | |
|---|---|---|
| EP | 1 227 249 A1 | 7/2002 |
| FR | 2 487 019 | 1/1982 |

* cited by examiner

*Primary Examiner*—Thomas E Lazo
(74) *Attorney, Agent, or Firm*—Quarles & Brady; George E. Haas

(57) ABSTRACT

A hydraulic system provides failure protection by incorporating an isolator adjacent a hydraulic actuator. The isolator has a first port connected to the hydraulic actuator and a second port with an electrically operated isolation valve connected between those ports. A pressure relief valve responds when pressure in the hydraulic actuator exceeds a given level by relieving pressure thereby enabling the isolation valve to open without application of electricity and release the pressure in the hydraulic actuator. A control valve assembly is remote from the hydraulic actuator and connected to the second port for metering flow of fluid between a source and the hydraulic actuator.

21 Claims, 2 Drawing Sheets

FIG. 1
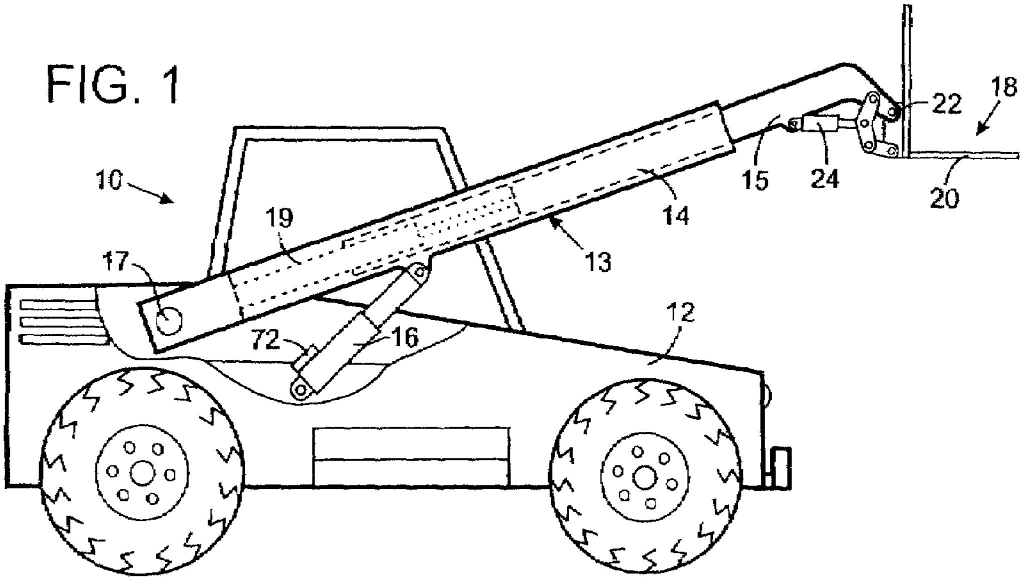
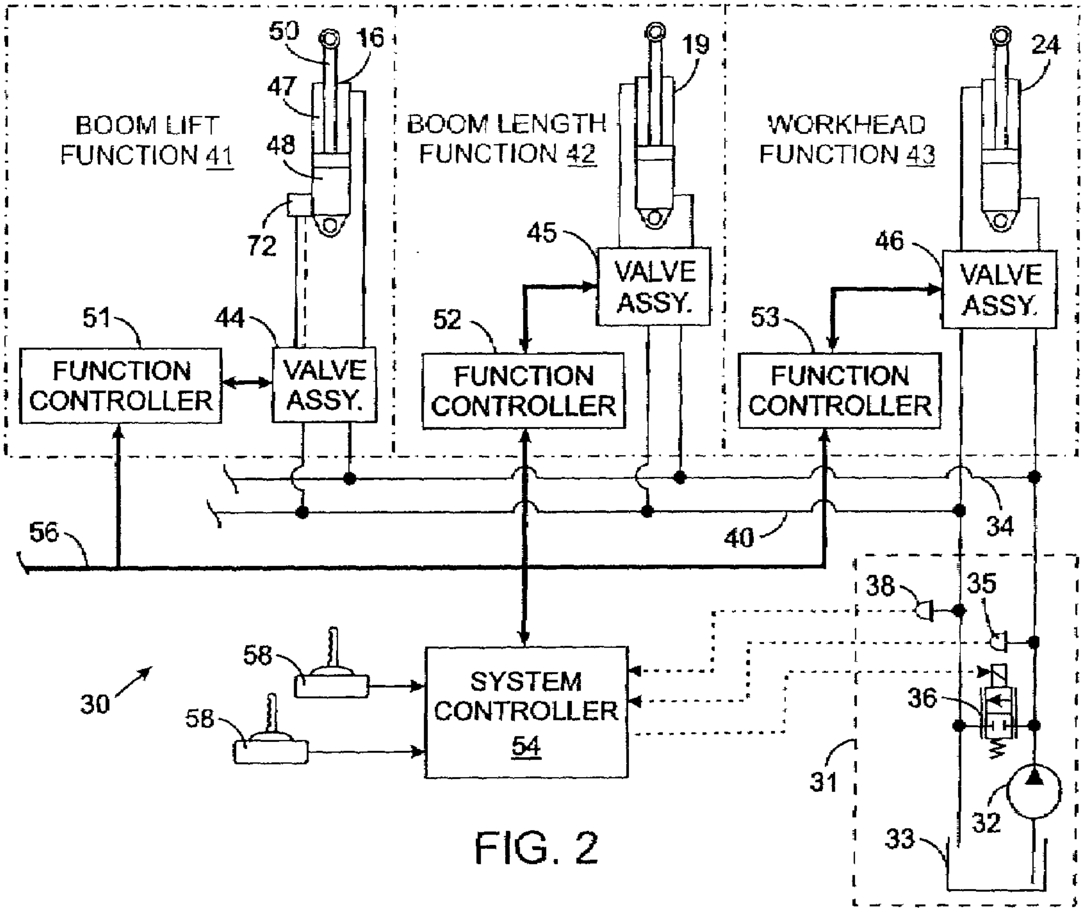
FIG. 2

HYDRAULIC SYSTEM WITH A CYLINDER ISOLATION VALVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems that control fluid flow to a hydraulic actuator which produces movement of a mechanical component on a machine, and in particular to preventing the mechanical component from moving in the event of a hydraulic system failure.

2. Description of the Related Art

Construction and agricultural equipment employ hydraulic systems to operate different mechanical elements. For example, a telehandler is a common material handling machine that has a pair of forks or a platform attached to the end of a telescopic boom pivotally coupled to a tractor. Separate hydraulic actuators are utilized to raise and lower the boom, vary the boom length, and tilt the forks or platform, with each of those operations being referred to as a "hydraulic function" of the machine. "Hydraulic actuator", as used herein, generically refers to any device, such as a cylinder-piston arrangement or a motor, that converts hydraulic fluid flow into mechanical motion.

The operator of the machine sits in a cab and manipulates levers or joystick to control the hydraulic actuators and thus the mechanical components of the machine. That manipulation operates valves that govern the flow of fluid from a pump to the hydraulic actuators. The valves may be located near the cab or elsewhere on the machine and are connected to the hydraulic actuators by hoses. Even when a valves are located relatively close to the associated hydraulic actuator hoses still are used.

The hoses on construction and agricultural equipment are exposed to physical abuse and harsh environmental conditions which results in deterioration that leads a hose bursting. When a hose between the valve assembly and the hydraulic actuator bursts, the fluid within the actuator is able to rapidly escape. If the ruptured hose is connected to a machine component that carries a heavy load, such as the boom of a telehandler or excavator, that rapidly escaping fluid may allow that component to drop precipitately resulting in damage or injury.

Therefore, it is desirable to provide a mechanism that prevents motion of a machine component upon failure of a hydraulic component connected thereto.

SUMMARY OF THE INVENTION

A hydraulic system with component failure protection controls flow of fluid between a hydraulic actuator and a source that includes a pump and a tank. The hydraulic actuator comprises a cylinder with a first chamber. A control valve assembly, which is remote from the cylinder, is connected to the source and controls the flow of fluid from the source to a workport and a return flow of fluid from the first workport to the source.

An isolator adjacent the cylinder includes an electrically operated isolation valve and pressure relief valve. The isolation valve is connected to the first chamber and to the workport and has a valve element wherein pressure in the cylinder acting on a first side of the valve element tends to open the isolation valve without requiring application of electricity. The pressure relief valve responds to pressure in the cylinder exceeding a given level by relieving pressure acting on a second side of the valve element, thereby enabling the isolation valve to open and release pressure in the cylinder. Preferably, the given level is defined by a connection of the pressure relief valve to the source, which connection bypasses the control valve assembly.

Should a hose or other type of conduit between the control valve assembly and the cylinder rupture, closure of the isolation valve prevents fluid in the cylinder from escaping and the boom dropping in an uncontrolled manner. The isolation valve also prevents uncontrolled motion should a valve in the control valve assembly become suck in the open state.

Another aspect of the present hydraulic system is to provide a small leakage path around or through the isolation valve which conveys the pressure in the cylinder to pressure sensors in the control valve assembly even when the isolation valve is closed.

BRIEF DESCRIPTION OF THE DRAWINGS

FIG. 1 is a partially cut-away, side view of a machine incorporating a hydraulic system according to the present invention;

FIG. 2 is a schematic diagram of the hydraulic system; and

DETAILED DESCRIPTION OF THE INVENTION

Figure 3:
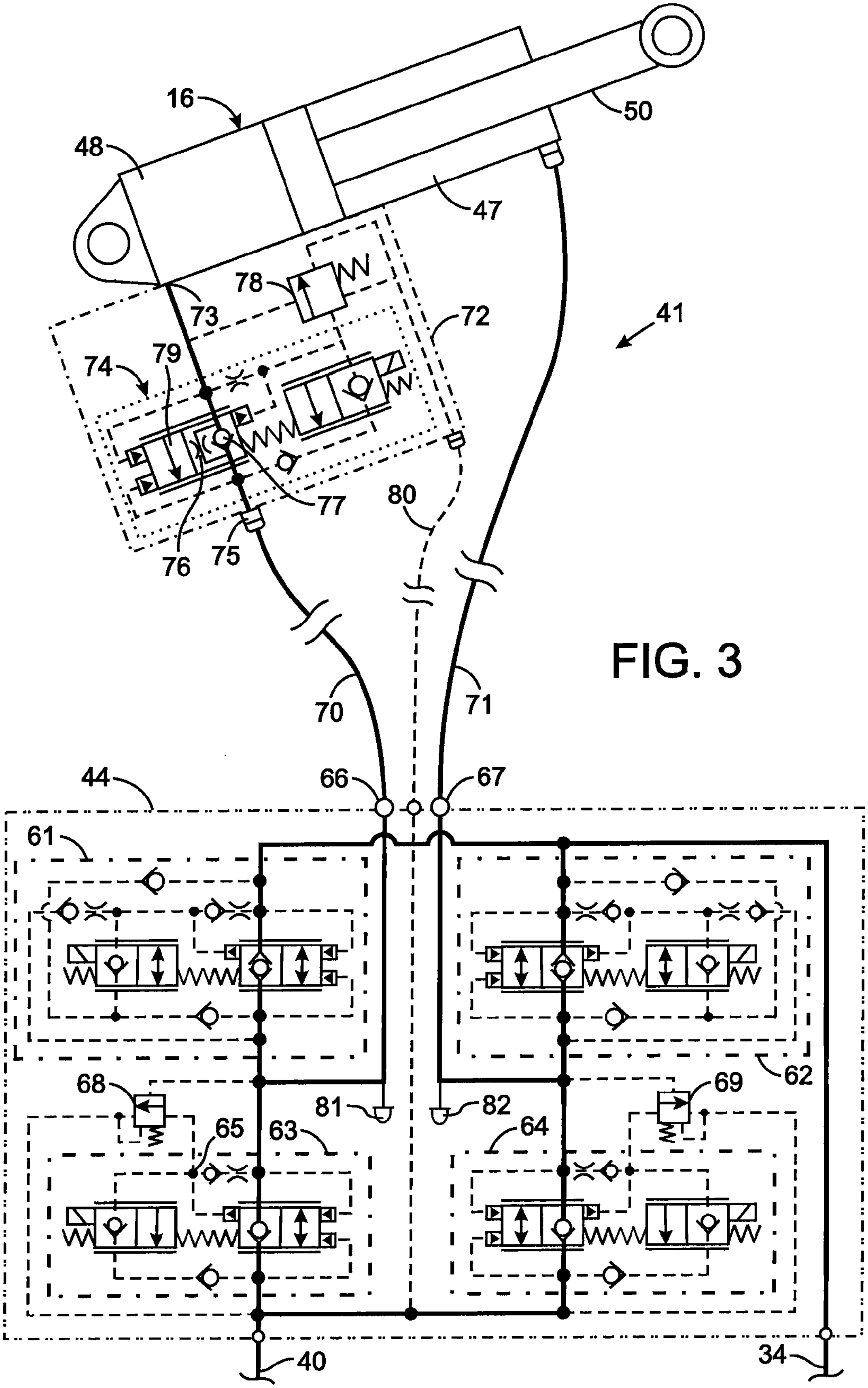
FIG. 3 is a diagram of the hydraulic components for controlling one of the cylinder-piston assemblies of the hydraulic system.

Although the present invention is being described in the context of use on a telehandler, it can be implemented on other types of hydraulically operated equipment.

With initial reference to FIG. 1, a hydraulic system according to the present invention is incorporated on a telehandler 10 that comprises a tractor 12 on which a boom 13 is pivotally mounted. A first hydraulic actuator, such as a boom lift cylinder 16, raises and lowers the boom 13 in an arc about a pivot shaft 17. The boom 13 comprises first and second sections 14 and 15 that can be extended and retracted telescopically in response to operation of another hydraulic actuator, such as a length cylinder 19 within the boom.

A workhead 18, such as a pair of pallet forks 20 or a platform for lifting items, is attached to pivot point 22 at the remote end of the second boom section 15. Other types of workheads may be utilized depending upon the work to be performed. A third hydraulic cylinder 24 tilts the workhead 18, specifically extension of a piston rod from that cylinder tilts the tips of the pallet forks 20 upward, and retraction of the piston rod lowers the fork tips.

With reference to FIG. 2, the various cylinders on the telehandler 10 are part of a hydraulic system 30 that has a source 31 of hydraulic fluid, which comprises a pump 32 and a tank 33. The pump 32 draws fluid from the tank 33 and forces the fluid under pressure into a supply line 34. After being used to power a cylinder-piston assembly of the telehandler, the fluid flows back to the tank 33 through a return line 40.

The hydraulic system 30 controls three separate hydraulic functions 41, 42 and 43 of the machine, which respectively change the boom lift angle, the boom length, and workhead tilt. The boom lift function 41 vertically pivots the boom 13 with respect to the tractor 12 by operating the lift cylinder 16 which has a rod chamber 47 and a head chamber 48 on opposite sides of the piston. A first control valve assembly 44 couples the rod and head chambers to the supply and return lines 34 and 40 and controls the flow of fluid to and from the lift cylinder 16. In particular, supplying pressurized hydraulic fluid from the supply line 34 to the rod chamber 47 and draining fluid from the head chamber 48 retracts the piston rod 50 into the lift cylinder 16, thereby lowering the boom 13. Similarly, supplying pressurized fluid to the head chamber 48 and draining fluid from the rod chamber 47 extends the piston rod 50 from the lift cylinder 16 and raises the boom 13.

The boom length function 42 has a hydraulic circuit similar to that of the boom lift function 41 and includes a second control valve assembly 45 that governs fluid flow to and from chambers of the length cylinder 19. Selective application of that fluid either extends the piston rod from the length cylinder 19, thereby extending the second boom section 15 from the first section 14, or retracts the piston rod into the length cylinder 19 which retracts the second boom section 15 into the first section 14. The workhead function 43 has a third control valve assembly 46 that controls the flow of fluid to and from chambers of the third hydraulic cylinder 24 which tilts the workhead 18 up and down at the end of the boom 13.

Each hydraulic function 41, 42 and 43 includes a function controller 51, 52 and 53, respectively, that operates the associated control valve assembly 44, 45 and 46. Every function controller 51-53 is a microcomputer based circuit which receives control signals from a system controller 54 via a communication network 56. A software program executed by the function controller 51-53 responds to those signals by producing output signals that operate the respective control valve assembly 44-46.

The system controller 54 supervises the overall operation of the hydraulic system 30. A plurality of joysticks 58 are connected to the system controller 54 by which the machine operator designates how the hydraulic functions are to operate. The system controller also receives signals from a supply conduit pressure sensor 35 at the outlet of the pump 32, a return conduit pressure sensor 38. In response to the various input signals, the system controller 54 operates an unloader valve 36 to regulate pressure in the supply line to satisfy the pressure demands of the different hydraulic functions 41-43.

FIG. 3 depicts the hydraulic circuit for the boom lift function 41. In particular, the first control valve assembly 44 comprises four electrohydraulic proportional (EHP) valves 61, 62, 63 and 64 that are connected in a Wheatstone bridge arrangement. Each of the EHP valves is a pilot-operated device, such as the one described in U.S. Pat. No. 6,745,992. The first EHP valve 61 controls the flow of hydraulic fluid from the supply line 34 to the head chamber 48 of the boom lift cylinder 16 connected to a first workport 66 and the second EHP valve 62 controls the flow of fluid from the supply line to the rod chamber 47 connected to a second workport 67. The third EHP valve 63 controls a path for fluid to flow from the cylinder head chamber 48 and the return line 40, while the fourth EHP valve 64 is connected between the rod chamber 47 and the return line 40. The four EHP valves 61-64 are solenoid operated independently by signals from the function controller 51. By opening the first and fourth EHP valves 61-64 pressurized fluid is applied to the head chamber 48 and drained from the rod chamber 47 to extend the piston rod 50 and raise the boom 13. Similarly, opening the second and third EHP valves 62 and 63 sends pressurized fluid into the rod chamber 47 and drains fluid from the head chamber 48 to retract the piston rod 50 and lower the boom 13.

The first control valve assembly 44 further includes a first pressure relief valve 68 that responds to pressure at the first workport 66 exceeding a predefined threshold level by opening a fluid path between the control chamber of the third EHP valve 63 and the return line 40. Opening the first pressure relief valve 68 relieves pressure in the control chamber, thereby causing the third EHP valve 63 to open and release the pressure at the first workport 66 to the return line 40. Similarly, a second pressure relief valve 69 responds to an excessively high pressure at the second workport 67 by opening a path between the control chamber of the fourth EHP valve 64 and the return line 40. This pressure relief action causes the fourth EHP valve 64 to open and relieve the second workport pressure.

A pair of pressure sensors 81 and 82 sense the hydraulic pressure at the first and second workports 66 and 67, respectively.

The first and second workports 66 and 67 of the first control valve assembly 44 are connected to the lift cylinder 16 by a pair of hoses 70 and 71. This allows the first control valve assembly to be located some distance from the cylinder. Although the second hose 71 is connected directly to the rod chamber 47 of the lift cylinder 16, the first hose 70, that is connected to the first workport 66, is coupled to the head chamber 48 by an isolator 72 located on that cylinder. A first port 73 of the isolator 72 is connected to the cylinder head chamber 48 and the first hose 70 is connected to a second port 75.

The isolator 72 has an electrohydraulic proportional isolation valve 74 that is pilot-operated and is similar to the EHP valves 61-64 in the control valve assembly 44. However, the isolation valve 74 is unidirectional having a first state that provides a flow path between the head chamber and the first workport. In a second, de-energized, state of the isolation valve 74, an internal check valve 77 allows fluid to flow from the first control valve assembly 44 to the head chamber 48. Although the check valve 77 preferably in integrated into the isolation valve 74, an external check valve can provide the same functionality. The isolation valve 74 has a small intentional leakage path 76 in the second state, thereby enabling pressure in the head chamber of the lift cylinder 16 to be applied continuously to the first sensor 81 regardless of the state of the isolation valve 74. However, the flow through the leakage path 76 is so small that it does not significantly affect operation of the isolator 72, even in the event that the first hose 70 bursts, as will be described.

The isolator 72 protects against a catastrophic event that would otherwise result if the hose 70 burst while the boom 13 is holding a very heavy load. Without the isolation valve 74, the burst hose would allow the fluid in the head chamber 48 to rapidly escape and abruptly drop the load. Now, when the boom 13 is stationary with respect to the tractor 12, both the first control valve assembly 44 and the isolation valve 74 are in closed states. Should the hose 70 now burst, the isolation valve 74 prevents fluid from escaping from the cylinder head chamber 48, that supports the boom 13. Should the hose burst when the isolation valve 74 is open in the first state, such as while boom 13 is being lowered, the operator can release the respective joystick 58. The system and function controllers 54 and 51 respond to the joystick by closing the isolation valve 74, which also prevents further motion of the boom 13. It should be understood that in the event of a hose burst or other catastrophic event, flow through the leakage path 76 is so minimal that only gradual lowering of the boom results.

If the boom 13 accidentally strikes an object, the resultant force applied to the boom can produce an excessively high pressure within the head chamber 48 of the lift cylinder 16. Because the isolation valve 74 is located on the lift cylinder 16, the pressure is trapped in that chamber when the isolation valve is closed and may cause severe damage to the cylinder. To avoid such damage, a third pressure relief valve 78, within the isolator 72, is connected to open when the pressure in the head chamber 48 exceeds a given level, or threshold. In a preferred embodiment, the given level at which is the same as the pressure level as that at which first pressure relief valve 68 in the first control valve assembly 44 opens. The operation of the third pressure relief valve 78 is referenced to the pressure level in the return line 40 by a connection 80 thereto, which provides a path that bypasses the EHP valves 61-64 in the control valve assembly 44. Thus, the path provided by the connection 80 is unaffected by the operation of the control valve assembly. Pressure within the head chamber 48 of the lift cylinder 16 is applied to a first side of a valve element 79 within the isolation valve 74. The third pressure relief valve 78 is connected to provide a relief path for pressure on the opposite, second side of the valve element 79 in the isolation valve 74.

Therefore, when the third pressure relief valve 78 opens, due to excessive head chamber pressure, the second side of the valve element 79 is exposed to relatively low pressure in the return line 40. Thus the excessive head chamber pressure that is applied to the first side of the valve element 79 forces the isolation valve 74 open even though electricity is not being applied to the solenoid. This action conveys the head chamber pressure to the control valve assembly 44 where that pressure causes the first pressure relief valve 68 to open. That further action releases pressure in the control chamber 65 of the third EHP valve 63 which also opens in response to the head chamber pressure thereby providing a path for that pressure to flow to the return line 40. Thus the excessive pressure produced in the lift cylinder by the boom 13 accidentally strikes an object is released before damage to the cylinder can occur.

If the boom 13 striking an object produces excessive pressure in the rod chamber 47 of the lift cylinder 16, the direct connection via the second hose 71 to the control valve assembly 44 causes the second relief valve 69 to open. That opening relieves the pressure in the control chamber of the fourth EHP valve, which thereby opens conveying the rod chamber pressure to the return line 40.

Another type of hydraulic system failure occurs when either the first or third EHP valve 61 or 63 becomes stuck in the open state. Without the isolator 72, the first EHP valve 61 sticking open continuously applies pressurized fluid to the lift cylinder 16. Should the third EHP valve 63 become stuck open, fluid would continuously drain from the lift cylinder 16 to the return line without the isolator 72 being present. However, the operator command the results in the EHP valves 61-64 closing also closes the isolation valve 74 in the isolator 72. Therefore, even if the first or third EHP valve 61 or 63 becomes stuck open, the isolation valve 74 closes to block flow into of out of the lift cylinder 16. Also when a proportional valve is used as the isolation valve 74, it can be employed to meter the fluid flow from the lift cylinder and control boom lowering, if third EHP valve 63 fails in the open state.

The foregoing description was primarily directed to preferred embodiments of the present invention. Although some attention was given to various alternatives within the scope of the invention, it is anticipated that one skilled in the art will likely realize additional alternatives that are now apparent from disclosure of embodiments of the invention. For example, the novel concepts can be applied to machine having two or more cylinders mechanically connected in parallel and hydraulically connected to a common workport of a control valve assembly, but having separate isolators. Accordingly, the scope of the invention should be determined from the following claims and not limited by the above disclosure.

What is claimed is:

1. A hydraulic system with component failure protection comprising:

a source of fluid including a pump and a tank;

a hydraulic actuator having a first chamber;

a control valve assembly remote from the hydraulic actuator and connected to the source, the control valve assembly having a first workport and controlling flow of fluid between the source and the first workport;

an isolation valve adjacent the hydraulic actuator and connected to the first chamber and to the first workport, the isolation valve having a valve element wherein pressure in the first chamber acts on the valve element tending to open the isolation valve, wherein the isolation valve has a first state that provides a path between from the first chamber to the first workport, and has a second state in which fluid can flow only in a direction from the first workport to the first chamber; and a pressure relief valve that responds to pressure in the first chamber exceeding a given level by relieving pressure acting on the valve element thereby enabling the isolation valve to open in response to pressure in the first chamber.

2. The hydraulic system as recited in claim 1 wherein the isolation valve is electrically operated.

3. The hydraulic system as recited in claim 1 wherein the isolation valve is pilot operated.

4. The hydraulic system as recited in claim 1 wherein the isolation valve proportionally controls flow of fluid.

5. The hydraulic system as recited in claim 1 wherein the hydraulic actuator includes a second chamber; and control valve assembly comprises a second workport coupled to the second chamber and four electrohydraulic proportional valves connected in a Wheatstone bridge arrangement between the first and second workports and the source.

6. The hydraulic system as recited in claim 1 further comprising a leakage path between the first chamber and the first workport, wherein pressure in the first chamber is communicated continuously to the control valve assembly.

7. The hydraulic system as recited in claim 1 wherein the control valve assembly controls flow of fluid from a source to the hydraulic actuator and independently controls flow of fluid from the hydraulic actuator to the source.

8. A hydraulic system with component failure protection comprising:

a source of fluid including a pump and a tank;

a hydraulic actuator having a first chamber;

a control valve assembly remote from the hydraulic actuator and connected to the source, the control valve assembly having a first workport and controlling flow of fluid between the source and the first workport;

an isolation valve adjacent the hydraulic actuator and connected to the first chamber and to the first workport, the isolation valve having a valve element wherein pressure in the first chamber acts on the valve element tending to open the isolation valve; and a pressure relief valve that responds to pressure in the first chamber exceeding a given level by relieving pressure acting on the valve element thereby enabling the isolation valve to open in response to pressure in the first chamber, wherein the given level for the pressure relief valve is defined by a fluid path between the pressure relief valve and the source which fluid path bypasses the control valve assembly.

9. The hydraulic system as recited in claim 8 wherein the given level is defined by a connection of the pressure relief valve to the tank which provides a fluid path that is unaffected by operation of the control valve assembly.

10. The hydraulic system as recited in claim 9 further comprising a first pressure sensor that senses pressure at the first workport.

11. The hydraulic system as recited in claim 8 wherein the isolation valve is electrically operated.

12. The hydraulic system as recited in claim 8 wherein the isolation valve is pilot operated.

13. A hydraulic system with component failure protection comprising:

a source of fluid including a pump and a tank;

a hydraulic actuator having a cylinder with a first chamber;

an isolator adjacent the cylinder with a first port connected to the first chamber and a second port, the isolator including an electrically operated isolation valve connected between the first and second ports and a leakage path between the first and second ports, wherein pressure in the first chamber is continuously communicated to the second port and a control valve assembly remote from the cylinder and connected to the second port for controlling flow of fluid from a source to the hydraulic actuator and back from the hydraulic actuator to the source.

14. The hydraulic system as recited in claim 13 wherein the electrically operated isolation valve has a first state that provides a path between the first chamber and the control valve assembly, and has a second state in which fluid can flow through the electrically operated isolation valve only in a direction from the control valve assembly to the first chamber.

15. The hydraulic system as recited in claim 13 wherein the electrically operated isolation valve proportionally controls flow of fluid.

16. The hydraulic system as recited in claim 13 wherein the isolator further comprises a pressure relief valve that responds to pressure in the first chamber exceeding a given level by opening a fluid path to relieve that pressure and thereby enable the electrically operated isolation valve to open.

17. The hydraulic system as recited in claim 13 wherein:

the electrically operated isolation valve comprises a valve element wherein pressure in the first chamber acts on a first side of the valve element and tends to open the electrically operated isolation valve; and the isolator further comprises a pressure relief valve that responds to pressure in the first chamber exceeding a given level by relieving pressure acting on a second side of the valve element, thereby enabling the electrically operated isolation valve to open in response to pressure acting on the first side.

18. The hydraulic system as recited in claim 17 wherein the given level is defined by a connection of the pressure relief valve to the source.

19. The hydraulic system as recited in claim 17 wherein the given level is defined by a connection of the pressure relief valve to the tank.

20. The hydraulic system as recited in claim 13 wherein the cylinder with a first chamber includes a second chamber; and control valve assembly comprises a first workport coupled to the isolator, a second workport coupled to the second chamber, and four electrohydraulic proportional valves connected in a Wheatstone bridge arrangement between the first and second workports and the pump and the tank.

21. The hydraulic system as recited in claim 13 wherein the control valve assembly controls the flow of fluid from a source to the hydraulic actuator independently of controlling flow of fluid from the hydraulic actuator to the source.

* * * * *